United States Patent [19]  
Emerick

[11] Patent Number: 4,741,111  
[45] Date of Patent: May 3, 1988

[54] RECREATIONAL VEHICLE HOOK-UP AID

[76] Inventor: George D. Emerick, 1595 Manzanita Ave., Space #13, Chico, Calif. 95926

[21] Appl. No.: 90,701

[22] Filed: Aug. 27, 1987

[51] Int. Cl.⁴ ............................................. B60Q 1/26
[52] U.S. Cl. ................................... 33/264; 116/28 R
[58] Field of Search .............. 33/264, 293; 116/28 R; 280/477

[56] References Cited

U.S. PATENT DOCUMENTS 3,858,966 1/1975 Lowell ........................ 116/28 R X
4,541,183 9/1985 McConnell ........................... 33/264
4,621,432 11/1986 Law ..................................... 33/264

Primary Examiner—Harry N. Haroian

[57] ABSTRACT

A target and aiming method with apparatus for accurately lining up a towing vehicle to a tow-type recreational vehicle or trailer for easy hook-up. Attachable components for accurate alignment of the trailer tongue to the towing vehicle hitch ball through use of a pointer and a target strip on the rear window of the towing vehicle is detailed in the specification and illustrated in the drawings.

1 Claim, 1 Drawing Sheet

RECREATIONAL VEHICLE HOOK-UP AID

BACKGROUND OF THE INVENTION

1. Field of the Invention

This invention relates to devices for lining up a towing vehicle to a recreational vehicle for hooking up the hitch ball to the trailer tongue. The present invention is particularly directed towards a positive-sight alignment device using an aiming structure affixed to the trailer tongue and a target strip positioned in the rear window of the towing vehicle.

2. Description of the Prior Art

The patents seen which appeared to me to be most pertinent to my invention included:

· A patent issued to Critchlow, dated June 6, 1939, U.S. Pat. No. 2,161,457, shows an "Indicating Device for Automobiles."

The Folkins et al patent dated Jan. 16, 1968, U.S. Pat. No. 3,363,318, shows a trailer hitch sight.

Lehtisaari received U.S. Pat. No. 3,918,746, on Nov. 11, 1975, for a trailer and towing vehicle coupler guide.

A patent issued to Campbell on Oct. 18, 1977, U.S. Pat. No. 4,054,302, shows a trailer hitch guide.

On Mar. 11, 1980, Myers received U.S. Pat. No. 4,192,526, for a trailer hitch guiding device.

The Berry patent dated Aug. 25, 1981, U.S. Pat. No. 4,285,138, is entitled "Trailer Hitch Visual Alignment Device."

U.S. Pat. No. 4,583,481, dated Apr. 22, 1986, issued to Garrison discloses a method and apparatus for hitching a trailer to a motor vehicle.

The patent issued on Nov. 11, 1986, to Law, U.S. Pat. No. 4,621,432, is for a trailer hook-up guide system.

To my knowledge, the foregoing patents represented devices most pertinent to my invention. Although hook-up alignment devices are necessarily somewhat similar, I saw no systems or components which were in close proximity with my device.

SUMMARY OF THE INVENTION

In practicing my invention, I have developed a target and aiming method for accurately lining up a towing vehicle to a trailer for ease in positioning the hitch ball on the towing vehicle with the trailer tongue. My invention includes the necessary attachable components for alignment of the trailer tongue to the tow vehicle hitch ball and a strip target for the rear window of the towing vehicle.

Therefore, it is a primary object of my invention to provide an aiming structure for attachment to the tongue of a tow-type recreational vehicle and a cooperative aligning target affixed to the rear window of a towing vehicle.

Another object of the invention is to provide equipment designed for accurately aligning the tongue of a tow-type recreational vehicle with the hitch ball on a towing vehicle.

A still further object of my invention is to provide a method to make a backing up towing vehicle easily aligned for hookup to a recreational vehicle.

Other objects and the many advantages of my invention will be better understood by a reading of the numbered parts described in the specification and comparing them with similar numbered parts shown in the accompanying drawings.

DRAWING REFERENCE NUMERALS

Figure 1:
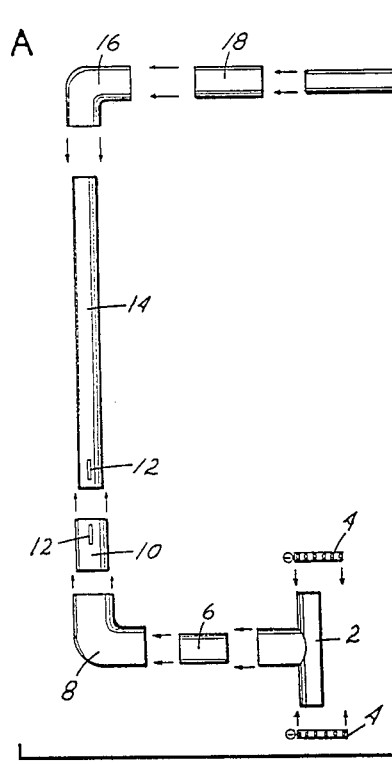
FIG. 1 shows the preferred embodiment of the present invention with the components aligned for assemblage in an exploded view.

2 T-joint mounting bracket
4 mounting bracket hose clamps
6 mounting bracket horizontal connector
8 ninety degree elbow
10 base vertical pipe connector
12 vertical alignment strips
14 vertical extension pipe
16 ninety degree reduction elbow
18 pointer horizontal connector
20 horizontal pointer
22 vehicle window target strip
24 towing vehicle
26 jack shaft
28 jack handle
30 trailer hitch tongue
32 propane bottle
34 trailer recreational vehicle
36 hitch ball

DESCRIPTION OF THE PREFERRED EMBODIMENT

Figures 2, 3:
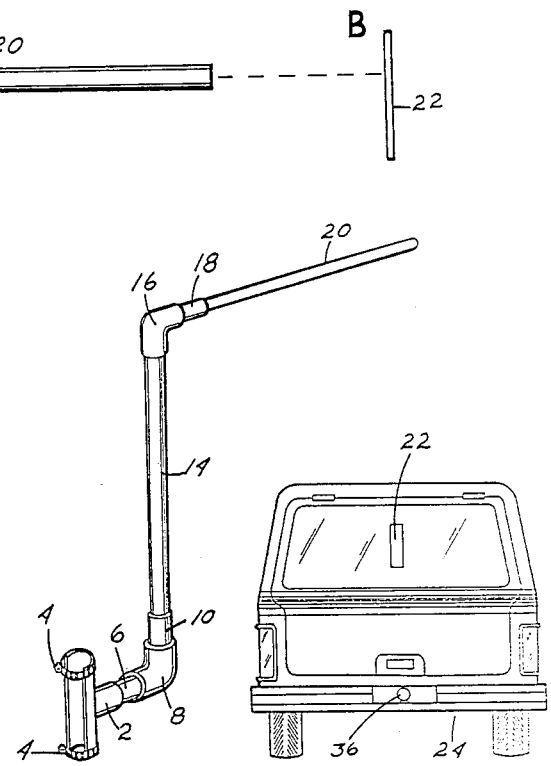
FIG. 2 shows the invention in a perspective view assembled.
FIG. 3 shows the towing vehicle in a rear view to illustrate the target strip in the rear window.

Referring now to the drawings at FIG. 1 where the preferred embodiment of the invention is illustrated with the parts aligned for assemblage in an exploded view. T-joint mounting bracket 2 has a vertical half-round section sized to fit trailer jack shaft 26 (FIG. 4) and retained by mounting bracket hose clamps 4. Mounting bracket horizontal connector 6 holds ninety degree elbow 8 to the horizontal T-joint of T-joint mounting bracket 2. Base vertical pipe connector 10 fits the vertically positioned end of ninety degree elbow 8 and holds vertical extension pipe 14 fixed in alignment by matching vertical alignment strips 12 adjacently positioned on vertical extension pipe 14 and base vertical pipe connector 10. As illustrated in FIG. 1, the larger end of ninety degree reduction elbow 16 fits the uppwardly end of vertical extension pipe 14 and the smaller end of ninety degree reduction elbow 16, horizontally aligned, fits pointer horizontal connector 18. The length of horizontal pointer 20 is arranged by telescoping or replacement to be sized for a particular use and fitted to pointer horizontal connector 18 and is the guiding member to be aimed at vehicle window target strip 22. The perspective drawing of the assembled invention at FIG. 2 best illustrates the assemblage of the foregoing described numbered parts and FIG. 3 in the drawings illustrates the towing vehicle 24 with the vehicle window target strip 22 in the rear window.

Figure 4:
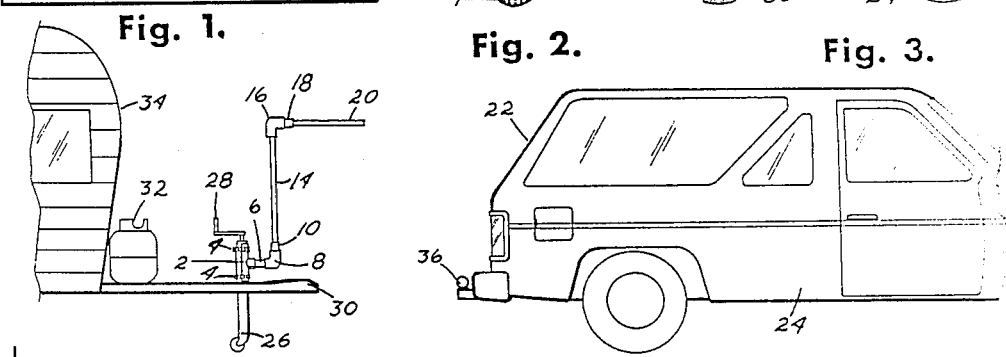
FIG. 4 shows the recreational vehicle with the hookup aid attached to the trailer tongue jack shaft with the assemblage of the hook-up aid on the towing vehicle side of the jack shaft and the horizontal pointer shortened.
Figure 5:
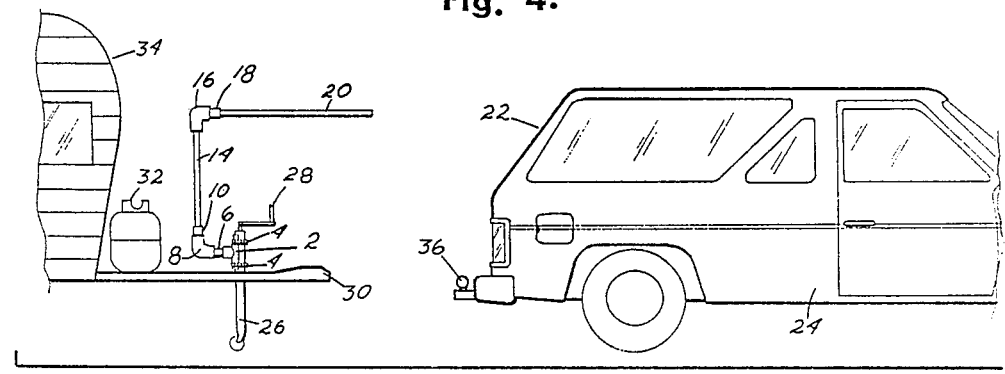
FIG. 5 shows the recreational vehicle with the hook-up aid attached on the trailer side of the tongue jack shaft with the horizontal pointer lengthened for use in this position.

In FIG. 4 of the drawings, the recreational vehicle hook-up aid is illustrated assembled and fastened in a frontward position to trailer recreational vehicle 34 on jack shaft 26 on the upwardly side of trailer hitch tongue 30. T-joint mounting bracket 2 is affixed by mounting bracket hose clamps 4 to jack shaft 26 just below jack handle 28. When possible, the positioning of the recreational vehicle hook-up aid forward as shown in FIG. 4 leaves clearance between propane bottle 32, usually positioned as shown, and the hook-up aid structure. The length of horizontal pointer 20 is determined by the tow vehicle in use. As pictured in FIG. 4, a station wagon type vehicle 24, target 22 is at the rear of the vehicle and a shorter horizontal pointer 20 is used. FIG. 5 illustrates the hook-up structure positioned towards trailer 34 and a longer horizontal pointer 20 is illustrated in use. In both FIG. 4 and FIG. 5, tow vehicle 24 is backed towards trailer 34 with horizontal pointer aligned with vehicle window target strip 22. When the end of horizontal pointer contacts vehicle window target strip 22 hitch ball 36 is directly under the hitch receptacle of trailer hitch tongue 30 and attaching trailer hitch tongue 30 to hitch ball 36 is easily accomplished. The structural materials used in this device must be strong light weight plastic, preferably PVC pipe, and fittings as illustrated in the drawings.

Although I have described my invention in length and with details in the specification, it is to be understood that modifications may be practices in the invention which do not exceed the intended coverage of the appended claims.

I claim:
1. Apparatus for a recreational vehicle hook-up aid comprising:
    an assemblage of fitted plastic pipes of the PVC designation or similar with attaching and guiding fixtures including:
    a T-joint mounting bracket with the T top member half rounded longitudinally for vertical mounting to the jack shaft of a trailer hitch and the leg member tubular for horizontal attachment to a continuing connector;
    a short plastic pipe connector sized to interfit said leg member as a horizontal connector to
    a plastic ninety degree elbow sized to accept said horizontal connector and vertically attach to
    a short vertically positioned pipe connector having a single longitudinal alignment stripe in the outer surface adjacent an upwardly end to match a similar alignment strip in the downwardly end of
    a vertical plastic pipe extension of sufficient length to position a ninety degree reduction elbow, a horizontally aligned reduction fitting, and a horizontal pointer formed of a removable length of plastic pipe aligned centrally with the rear window of a motor vehicle, there being a peel-off backed target strip as a part hereof for attachment inside said motor vehicle said rear window;
    a set of two hose-clamp type adjustable mounting brackets sized to said top T member half and to said jack shaft.

* * * * *